US008639971B1

(12) United States Patent
White (10) Patent No.: US 8,639,971 B1
(45) Date of Patent: Jan. 28, 2014

(54) CONDITION DETECTION AND REPORTING IN COMPLEX SYSTEMS

(75) Inventor: Philip White, San Mateo, CA (US)

(73) Assignee: Scale Computing, San Mateo, CA (US)

( * ) Notice: Subject to any disclaimer, the term of this patent is extended or adjusted under 35 U.S.C. 154(b) by 81 days.

(21) Appl. No.: 13/029,872

(22) Filed: Feb. 17, 2011

(51) Int. Cl.
*G06F 11/00* (2006.01)

(52) U.S. Cl.
USPC .......................................... 714/6.24; 707/687

(58) Field of Classification Search
USPC .................. 707/689, 687; 714/6.24
See application file for complete search history.

(56) References Cited

U.S. PATENT DOCUMENTS

| | | | |
|---|---|---|---|
| 5,761,669 | A | 6/1998 | Montague et al. |
| 6,023,706 | A | 2/2000 | Schmuck et al. |
| 6,085,244 | A | 7/2000 | Wookey |
| 6,275,898 | B1 * | 8/2001 | DeKoning ............... 711/114 |
| 6,675,258 | B1 * | 1/2004 | Bramhall et al. ......... 711/114 |
| 6,775,824 | B1 | 8/2004 | Osborne et al. |
| 6,961,937 | B2 | 11/2005 | Avvari et al. |
| 6,968,382 | B2 | 11/2005 | McBrearty et al. |
| 6,981,102 | B2 | 12/2005 | Beardsley et al. |
| 7,165,189 | B1 | 1/2007 | Lakkapragada et al. |
| 7,343,587 | B2 | 3/2008 | Moulden et al. |
| 7,370,101 | B1 | 5/2008 | Lakkapragada et al. |
| 7,373,438 | B1 | 5/2008 | DeBergalis et al. |
| 7,409,497 | B1 | 8/2008 | Kazar et al. |
| 7,426,729 | B2 | 9/2008 | Avvari et al. |
| 7,457,880 | B1 | 11/2008 | Kim |
| 7,574,464 | B2 | 8/2009 | Hitz et al. |
| 7,937,421 | B2 * | 5/2011 | Mikesell et al. ............. 707/825 |
| 7,991,969 | B1 * | 8/2011 | Chatterjee et al. .......... 711/156 |
| 2002/0138559 | A1 | 9/2002 | Ulrich et al. |
| 2004/0148138 | A1 * | 7/2004 | Garnett et al. ............... 702/189 |
| 2005/0246612 | A1 | 11/2005 | Leis et al. |
| 2005/0273659 | A1 | 12/2005 | Shaw |
| 2005/0278576 | A1 | 12/2005 | Hekmatpour |
| 2006/0041780 | A1 | 2/2006 | Budaya et al. |
| 2008/0021951 | A1 | 1/2008 | Lurie et al. |
| 2013/0067294 | A1 * | 3/2013 | Flynn et al. ................ 714/773 |

* cited by examiner

*Primary Examiner* — Cheryl Lewis
(74) *Attorney, Agent, or Firm* — Dorsey & Whitney LLP (57) ABSTRACT

Maintaining consistency and freshness of information about an operational system, assuring consistent actions by system actors, assuring that system elements use only a single global status of the system for any particular status time, assuring that each pair of elements acts only upon consistent status values, assuring that system elements operate only with status values measured sufficiently recently to be reliable. Information collectors respond to status values. Information containers respond to information collectors, maintaining status values and metadata indicating whether those status values are reliable, or are consistent with respect to known correct values. Information conditions respond to information collectors or information containers, maintaining logical consistency with a unified global status. System actors respond to information containers or information conditions, acting logically consistent with that global status. System actors might include those which notify monitors or operators, and those which modify the system to detect and correct operation gone awry.

16 Claims, 2 Drawing Sheets

CONDITION DETECTION AND REPORTING IN COMPLEX SYSTEMS

BACKGROUND

In complex systems, particularly in relatively complex data storage and retrieval systems, it might occur that conditions of individual components of the system should be noticed, and action taken thereon. For just one example, in a RAID storage system it might occur that one of the disk drives becomes unavailable or unreliable. In such cases, the system might respond by alerting an operator to that condition, and upon re-availability or the presence of a newly available and reliable disk drive, the system might take remedial measures, such as for example re-striping and recomputing parity for a set of striped data blocks formerly maintained, in whole or in part, on the disk drive that was repaired or replaced.

One problem in the known art is that when such systems are relatively complex, whether in design, in implementation, or in operation, action taken by one component of the system might have an unexpected effect upon other components of the system. For just one example, in a storage system with multiple tiers, such as for example a system including paging memory blocks to storage on disk, it might occur that one element of the system might be attempting to read data from, or write data to, a disk drive, while another element of the system is attempting to determine if that disk drive is reliable or if its data should be moved to another location. Multiple such operations might be inconsistent if performed concurrently, or at least without provision for the possibility that such multiple operations might occur.

Known methods include operating system locking techniques. While these techniques generally achieve their purpose of preventing inconsistent operations from occurring concurrently, they have at least the drawback that they involve careful checks, either during design and operation, to assure that they are uniformly consistent and do not interfere.

SUMMARY OF THE DESCRIPTION

This description includes techniques, including methods, physical articles, and systems, which provide the effect of maintaining consistency and freshness of information about a system in operation, and which provide the effect of maintaining consistency of actions by system actors. Consistency and freshness of information about a system might include hardware consistency, that is, information about the status of hardware elements of the system, software consistency, that is information about the status of software elements of the system, and otherwise, and combinations and conjunctions thereof.

Consistency of information has the effect of assuring that all elements that rely on status of the system will operate using only a single global status of the system for any particular status time. For example and without limitation, no two elements will ever act upon status values that are inconsistent. Freshness of information has the effect of assuring that each element that relies on status values of the system will operate only with status values that have been measured sufficiently recently as to be reliable. Consistency of actions has the effect of assuring that all elements that act in reliance upon status of the system will operate pairwise consistently. For example and without limitation, no two elements would operate at cross-purposes to one another.

While this application describes errors and inconsistencies relating to hardware types of failures, such as for example disk related errors, in the context of the invention, there is no particular requirement for any such limitation. For example and without limitation, it might sometimes occur that errors, failures, or inconsistencies might appear or occur in response to actions by software components, particularly but not limited to those software components integrated into portions of the operating system or firmware by another vendor, obtained from external vendors, or otherwise, or some combination or conjunction thereof.

In one embodiment, it might occur that software errors, also known as bugs, might appear or occur in response to third-party components, the interaction of more than one such third-party components, the interaction of such third-party components with trusted code, or otherwise, or some combination or conjunction thereof. Accordingly, the reader is urged not to limit the description of the invention as relating only to hardware types of failures, but also to understand that software types of failures, or combinations or conjunctions of hardware and software failures, such as for example relatively unknown software bugs arising out of operation of third-party components.

For example and without limitation, external software components might include information collectors that generally provide useful data, but which infrequently or otherwise from time to time erroneously provide undocumented or unexpected output values (such as for example, floating-point values where integer values are expected), or which erroneously provide output values that are clearly invalid (such as for example, negative values for available disk free space or disk size), or which generate crash results, invalid interrupts, memory leaks or other memory errors, or other types of software-related (or combinations or conjunctions of software-related and hardware-related) errors. In such cases, an information container's metadata might indicate that the external software component has generated an error, might indicate a type of failure, a specific type of failure, a possible corrective action or possible likely non-erroneous value, or a component, sub-component, or other logic associated with a decision function that might be able to respond to such metadata.

This has the effect that consistency and freshness of information, or the single global status of the system, have the advantage of insulating trusted code from otherwise unapparent or unknown errors in hardware or software components from external vendors. Sometimes those hardware or software components from external vendors are relied upon for accurate and reliable operation of a system; in such cases, it is desirable that otherwise unapparent or unknown errors from external vendors be identified and, preferably, ameliorated, without substantial negative system problems.

These features might be provided in combination or conjunction with techniques which include one or more of the following:

a substantially independent level or set of information collectors, each of which is responsive to a status aspect of the system;

a substantially independent level or set of information containers, each of which is responsive to one or more information collectors, and each of which maintains both status values and metadata about those status values indicative of whether those status values can be reliably used by system elements, and of whether those status values are consistent with known correct values (that is, are consistent with being accurate);

a substantially independent level or set of information conditions, each of which is responsive to one or more information containers or other information conditions, and each of which is logically consistent with a single global status of the system; and a substantially independent level or set of system actors, each of which is responsive to one or more information containers or information conditions, and each of which has an associated action, those actions being logically consistent with a single global status of the system.

In one embodiment, system actors might be divided into (1) notifiers, which might be read-only with respect to the system and serve to present notifications to system monitors or system operators, and (2) ameliorators, which might both read system status and act upon that system status to correct errors, distribute or redistribute load, or otherwise detect and correct system operation gone awry.

DESCRIPTION

Generality of the References

This application should be read in the most general possible form. This includes, without limitation, the following:

- References to contemplated causes and effects for some implementations do not preclude other causes or effects that might occur in other implementations.
- References to one embodiment or to particular embodiments do not preclude alternative embodiments or other embodiments, even if completely contrary, where circumstances would indicate that such alternative embodiments or other embodiments would also be workable.
- References to particular reasons or to particular techniques do not preclude other reasons or techniques, even if completely contrary, where circumstances would indicate that the stated reasons or techniques are not as applicable.
- References to "preferred" techniques generally mean that the inventors contemplate using those techniques, and think they are best for the intended application. This does not exclude other techniques for the invention, and does not mean that those techniques are necessarily essential or would be preferred in all circumstances.
- References to specific techniques include alternative and more general techniques, especially when discussing aspects of the invention, or how the invention might be made or used.

Generality of the Techniques

Technologies shown or suggested by this description should also be thought of in their most general possible form. This includes, without limitation, the following:

- The phrases and terms "constantly", "continually", "from time to time", "occasionally", "periodically" (and similar terms and phrases) generally indicate any case in which a method or technique, or an apparatus or system, operates over a duration of time, including without limitation any case in which that operation occurs only part of that duration of time. For example and without limitation, these terms would include, without limitation, methods which review a status as frequently as feasible, on a periodic schedule such as once per second or once per day, in response to an alarm or trigger such as a value reaching a threshold, in response to a request or an implication of a request, in response to operator intervention, otherwise, and to combinations and conjunctions thereof.
- The phrases and terms "effect", "with the effect of" (and similar terms and phrases) generally indicate any natural and probable consequence, whether or not assured, of a stated arrangement, cause, method, or technique, without any implication that an effect or a connection between cause and effect are intentional or purposive.
- The phrases and terms "data", "information" (and similar terms and phrases) generally indicate any form of bits/digits or values (whether analog, digital, or otherwise), collection or content, coincidence or correlation (whether causal or otherwise), evidence or logical tendency (whether probabilistic, pseudo-probabilistic or otherwise), or other indication of any kind from which a computing device, Turing-equivalent equivalent device, user, Artificial Intelligence, or other thinking being, might be able to draw conclusions. Although information is described herein with respect to classical bit-representations, in the context of the invention, there is no particular requirement for any such limitation. Information might be of a classical or quantum nature, might be of a Bayesian or Shannon or Kolmogorov or algorithmic nature, or might take on any other aspect consistent with the advantages or purposes described herein.
- The term "instruction" (and similar terms and phrases) generally indicate any information or other arrangement or disposal or matter or energy, having the property of being interpretable by a computing device, or other device, to perform operations (possibly conditional operations, parallel operations, pipelined operations, or other dispositions of method steps or operations as might be known or developed in the many fields of computing science), whether or not responsive to inputs, states or state-changes, or other instructions, from any source whatever, or otherwise, or combinations or conjunctions thereof.
- The phrases and terms "methods, physical articles, and systems", "techniques" (and similar terms and phrases) generally indicate any material suitable for description, including without limitation all such material within the scope of patentable subject matter, or having ever been considered within the scope of patentable subject matter, or which might colorably be within the scope of patentable subject matter, notwithstanding most recent precedent.
- The phrases and terms "pseudo-random", "random" (and similar terms and phrases) generally indicate any technique of any kind, in which information is generated or selected in a manner not predictable to the recipient. In the context of the invention, data, information, numbers, processes, or otherwise, referred to herein as "random", need not be equidistributed (or have any other particular distribution) over anything in particular, and might in general be pseudo-random in addition to, or in lieu of, being random.
- The term "relatively" (and similar terms and phrases) generally indicates any relationship in which a comparison is possible, including without limitation "relatively less", "relatively more", and the like. In the context of the invention, where a measure or value is indicated to have a relationship "relatively", that relationship need not be precise, need not be well-defined, need not be by comparison with any particular or specific other measure or value. For example and without limitation, in cases in which a measure or value is "relatively increased" or "relatively more", that comparison need not be with respect to any known measure or value, but might be with respect to a measure or value held by that measurement or value at another place or time.

The term "substantially" (and similar terms and phrases) generally indicates any case or circumstance in which a determination, measure, value, or otherwise, is equal, equivalent, nearly equal, nearly equivalent, or approximately, what the measure or value is recited. The terms "substantially all" and "substantially none" (and similar terms and phrases) generally indicate any case or circumstance in which all but a relatively minor amount or number (for "substantially all") or none but a relatively minor amount or number (for "substantially none") have the stated property. The terms "substantial effect" (and similar terms and phrases) generally indicate any case or circumstance in which an effect might be detected or determined.

The phrases "this application", "this description" (and similar terms and phrases) generally indicate any material shown or suggested by any portions of this application, individually or collectively, including all documents incorporated by reference or to which a claim of priority can be made or is made, and include all reasonable conclusions that might be drawn by those skilled in the art when this application is reviewed, even if those conclusions would not have been apparent at the time this application is originally filed.

The invention is not in any way limited to the specifics of any particular examples disclosed herein. After reading this application, many other variations are possible which remain within the content, scope and spirit of the invention; these variations would be clear to those skilled in the art, without undue experiment or new invention.

Real-World Nature

The invention includes techniques, including methods, physical articles, and systems, that receive real-world information dictated by real-world conditions (not mere inputs to a problem-solving technique). The techniques provided by the invention are transformative of the information received, at least in the senses that a $1^{st}$ type of information (information provided at different times and in response to distinct stimuli—and possibly thus pairwise inconsistent—by physical sensors (or combinations or conjunctions of physical sensors with logical apparatus) and other information collectors) is transformed into a $2^{nd}$ type of information (information suitable for presentation to, and use by, other system elements—wherein that $2^{nd}$ information is substantially consistent and fresh regarding the system as an operational whole);

a $1^{st}$ type of information (information representing a set of measurements of local state of a system—and possibly thus pairwise inconsistent—by physical sensors (or combinations or conjunctions of physical sensors with logical apparatus) and other information collectors is transformed into a $2^{nd}$ type of information (information representing a substantially consistent and substantially fresh holistic picture of a system as an operational whole); and a $1^{st}$ type of information (information representing a set of measurements and state of a system, whether those measurements and state represent physical values, logical values, or some combination or conjunction thereof) is transformed into a $2^{nd}$ type of information (information representing a set of instructions for notification of users and possibly for amelioration of system problems).

The invention also includes techniques that are tied to a particular machine, at least in the sense that a system includes particular types of elements (information collectors, information containers, information conditions, and system actors, as described herein); and a system that responds in distinct and defined ways in response to particular types of information, including without limitation notification of users and possibly amelioration of system problems.

This description includes a preferred embodiment of the invention with preferred process steps and data structures. After reading this application, those skilled in the art would recognize that embodiments of the invention can be implemented using general purpose computing devices or switching processors, special purpose computing devices or switching processors, other circuits adapted to particular process steps and data structures described herein, or combinations or conjunctions thereof, and that implementation of the process steps and data structures described herein would not require undue experimentation or further invention.

DEFINITIONS AND NOTATIONS

The following definitions are exemplary, and not intended to be limiting in any way:

The phrases and terms "actor", "system actor" (and similar terms and phrases) generally indicate any component or element with the effect of causing a state change in a system, including without limitation a state-change such as a notification of a user or other element, external to a system or otherwise. While this application describes systems in which actors include software elements operating using computing hardware, in the context of the invention, there is no particular requirement for any such limitation.

The phrases and terms "amelioration", "amelioration of system problems" (and similar terms and phrases) generally indicate any effort, method, or process (or any component or element configured or operating to provide such an effort, method, or process) with the effect that any aspect of system performance is alleviated or that any negative effect of system performance is otherwise mitigated, or that some aspect of system performance is improved, or that some aspect of system performance is reported to a user or other controlling element (such as for example an overseer system or other external alarm indicator), or otherwise, or any combination or conjunction thereof.

The phrases and terms "system performance" (and similar terms and phrases) generally indicate (1) any feature associated with a measure or indicator of performance of data delivery, such as for example throughput or latency, (2) any feature associated with a measure or indicator of system correctness, such as for example bit error rate, frequency or count of interrupts or error conditions, (3) any feature associated with a measure or indicator of data correctness, such as for example whether an individual system clock is correct with respect to a global reference or other reference, or (4) any other feature associated with a measure indicative of data transmission rate, data or other error, operational correctness or speed of the system or a portion thereof, (5) any other feature associated with operation of a system, or otherwise, or some combination or conjunction thereof.

The phrases and terms "fresh", "substantially fresh" (and similar terms and phrases) generally indicate data, information, values, state information or state-change information (or components or elements having or maintaining state indicative of such data, information, values, state information or state-change information), or otherwise, or some combination or conjunction thereof, which are substantially sufficiently recent that they might be used for the purpose for which they were intended, or some substantially similar purpose, or otherwise, or some combination or conjunction thereof. While this application describes "fresh" and "substantially fresh" as relating to recency of time, in the context of the invention, there is no particular requirement for any such limitation. For one example and without limitation, "fresh" or "substantially fresh" information might relate to the occurrence (or likelihood of occurrence) of events which would cause such data, information, values, state information or state-change information to be no longer useful or valid, or otherwise having less value than otherwise would be expected from recorded or maintained information.

The phrases "holistic picture", "system as an operational whole" (and similar terms and phrases) generally indicate a description of system error (or lack thereof), system health, system operation, system performance, or other indications or notifications of aspects of system performance that are generally applicable to substantially the entire system, or a substantial portion of the entire system, taken as a whole and not as individual variables which might be measured separately. While this application describes an "entire" system, in the context of the invention, there is no requirement for any such limitation. For example and without limitation, the concepts described herein are also applicable to sub-components or subsets of a system, particularly those sub-components or subsets of a system whose operation is relatively unified.

The phrases and terms "collector", "information collector" (and similar terms and phrases) generally indicate any element or portion of a system, or any effort, method, or process,
  with the effect that a status aspect of the system can be obtained, or
  with the effect that a status aspect of the system can be transformed in nature from a $1^{st}$ type of information about a status aspect that is about system operation (whether in the past, concurrently or presently, or predicted or predictable about the future) into a $2^{nd}$ type of information that might be includable in memory or mass storage, maintainable, recordable, or otherwise representative of that status aspect.

While this application describes a system in which a collector or an information collector relate to status information or state-change information about a portion of a system or a whole system, in the form of maintainable or usable data, in the context of the invention, there is no requirement for any such limitation. For example and without limitation, a collector or an information collector might indicate a component or element of the system, or of a portion thereof, useful or maintainable in any way that might be later appropriate for determining the absence or presence, degree of severity (if any), likely or possible cause or result, or likely or possible techniques associated with amelioration thereof.

The phrases and terms "condition", "information condition" (and similar terms and phrases) generally indicate any element or portion of a system, or any effort, method, or process, with the effect that a $1^{st}$ type of information maintained or maintainable by the system is transformed into a $2^{nd}$ type of information maintained or maintainable by the system, the latter having the effect of being a logical or probabilistic conclusion about a system status, or the latter having the property of being logically consistent with a single global system status or a holistic system status.

The phrases and terms "container", "information container" (and similar terms and phrases) generally indicate any element or portion of a system, or any effort, method, or process, with the effect that a $1^{st}$ type of information as maintained or recorded by an information collector is transformed into a $2^{nd}$ type of information as maintained or recorded by an information container, the latter having the property that more information than raw information about system status is maintained, such as for example without limitation, metadata about status values indicative of whether those status values can be reliably used by system elements.

The phrases and terms "actor", "element", "system actor", "system element" (and similar terms and phrases) generally indicate any aspect or portion of the system, its hardware and software elements (and state thereof, including without limitation data for such state thereof), each of which is responsive to one or more information containers or information conditions, and each of which has an associated action, those actions being logically consistent with a single global system status or holistic system status.

The term "notification" (and similar terms and phrases) generally indicates any effort, method, process with the effect that some problem with (or other aspect of) system performance is reported to a user or other controlling element (such as for example an overseer system or other external alarm indicator). For example and without limitation, a notification might include an email message, an IM message, an SMS or MMS message, a telephone call (possibly making use of IVR, interactive voice response), a telephone page (whether alphanumeric or numeric), a radio message or other communication message (for example and without limitation such as a packet message according to a protocol, possibly a protocol in which system errors or other system state are reported).

The phrases and terms "physical sensor", "sensor", "software element sensor" (and similar terms and phrases) generally indicate any form of apparatus, device, method, or process by which a state or state-change might be recognized, or whose absence might be recognized. For example and without limitation, a sensor might include an arithmetic or logic unit such as a parity computation element or other computation element, a computing device, a data structure, an interrupt handler, a memory cell, a software element, a thermometer, a timer, a user whose attention is drawn toward a value of a state or state-change, or otherwise, or some combination or conjunction thereof.

The term "presentation" (and similar terms and phrases) generally indicates any effort, method, or process with the effect that information is copied, placed into a readable form or other interpretable form, represented, sent, or otherwise transformed from a format in which that information is internally maintained to a format in which that information can be perceived, such as for example by a user, a human user, a overseer system or other alarm indicator, or any other form in which information is transformed from a $1^{st}$ state in which it is essentially maintained for storage into a $2^{nd}$ state in which it is essentially capable of being observed.

The phrases and terms "state", "state of a system" (and similar terms and phrases) generally indicate any information, whether representing only a portion or representing a substantial system or subsystem, with the effect that such state or system state information has a bearing on an aspect of system performance, whether in the past, concurrently or presently, or predicted or predictable for a future time. While this application describes states in which hardware-related information is material to the state or a state-change, in the context of the invention, there is no reason for any such limitation. For example and without limitation, a state or a state of a system might include software-related information, such as for example the absence or presence of an interrupt, a set of data or information associated with such an interrupt, a set of data or information associated with software-related values or other values appurtenant to software elements or subelements, otherwise, or any combination or conjunction thereof.

The term "stimulus" (and similar terms and phrases) generally indicate any form of state or state-change to which an apparatus, device, method, or process might be capable of responding, or to whose absence an apparatus, device, method, or process might be capable of responding. For example and without limitation, a stimulus might include a change in a data value, an input from a user, a passage of time, an error being noted or thrown or an interrupt being raised, or otherwise, or any combination or conjunction thereof.

After reading this application, those skilled in the art would recognize that these definitions would be applicable to techniques, methods, physical elements, software elements, combinations or conjunctions of physical elements and software elements, and systems—not currently known, or not currently known to be applicable by the techniques described herein—including extensions thereof that would be inferred by those skilled in the art after reading this application, even if not obvious to those of ordinary skill in the art before reading this application.

FIGURES AND TEXT

Where described as shown in a figure, one or more elements might include
  other items shown in the figure in addition to, or operating in combination or conjunction with, those particular one or more elements (or that those particular one or more elements in combination or conjunction with one or more other elements, whether shown or not shown in the figure, and whether described or not described with respect to the figure);
  one or more other elements not shown in the figure, but whose inclusion would be known to those skilled in the art, or which would be known after reasonable investigation, without further invention or undue experimentation; and
  subparts of those one or more elements, whether shown or not shown in the figure, which might be convenient for operation of those one or more elements, but which are not necessarily required in the described context, or which might be necessary for operation of those one or more elements in the described context, but which are not necessary for description at a level understandable to those skilled in the art.

Where described or shown in a figure, apparatus elements might include
  physical devices having the properties described or carrying out the functions associated therewith; such physical devices might include electronic circuits or other physical devices, whether specially designed for those properties or functions, or whether more generally designed and where adapted or configured for those properties or functions;
  electronic or other circuitry operating under control of software elements, those software elements being embodied in a physical form for at least a duration of time, with the effect that the electronic or other circuitry has the properties or functions associated therewith when operating under control of those software elements;
  software components having the properties described or carrying out the functions associated therewith; such software components might include information interpretable as instructions, associated with devices capable of performing those instructions, whether specially designed for those functions or instructions, or whether more generally designed and where adapted or configured for those functions or instructions.

Where described or shown in a figure, apparatus elements, including either physical elements or software components, might be coupled
  in a manner as shown in the figure, or where no specific coupling is shown, in a manner known to those skilled in the art (for example and without limitation, apparatus elements might be coupled mechanically, electronically, electromagnetically, or by one or more other techniques known to those skilled in the art, either in the alternative or in combination or conjunction, whether or not obvious at the time of this description, while software components might be coupled using any of the techniques known in the many fields of computer science, with or without assistance of additional software components, operating system elements, or by one or more other techniques known to those skilled in the art, either in the alternative or in combination or conjunction, whether or not obvious at the time of this description);
  in a manner as described in text referring to the figure, or where no specific coupling is described, in a manner known to have the properties or functions associated therewith, in at least some contexts as contemplated by the inventors or as implied by the description;
  in a manner other than as shown in the figure, or other than as described in the text, where the figure or text indicates that other such manners might be contemplated in the making or use of the invention, either in the alternative or in combination or conjunction, whether or not obvious at the time of this description;
  in a manner other than as shown in the figure, or other than as described in the text, where adaptation or configuration thereof might be involved in the properties or functions associated therewith.

For example and without limitation, where a context for making or use of the invention might involve a distinct adaptation or configuration thereof, those apparatus elements or software components might be so adapted or so configured to have, or to substantially approximate, properties or functions as described herein, or as would be known to those skilled in the art.

Where described or shown in a figure, flow labels, method steps, and flow of control might include
- one or more physical devices operating in combination or conjunction to perform the operations described, with the properties or functions thereof;
- one or more portions of a single device, or of a set of devices coupled or in communication, or otherwise operating in combination or conjunction thereof, to perform the operations described, with the properties or functions thereof;
- one or more software components operating in combination or conjunction, or with the assistance of other known techniques known in the many fields of computer science, to perform the operations described, with or without assistance of additional software components, such as for example operating system elements, firmware elements, or related elements.

For example and without limitation, one or more software threads, processes, data structures, or other constructs known in the many fields of computing sciences and engineering, coupled or in communication, or otherwise operating in combination or conjunction thereof, to perform the operations described, with the properties or functions thereof.

Where described or shown in a figure, flow labels, method steps, and flow of control might include
- one or more parallel flows of control, operating concurrently or in cooperation, in parallel or in a pipelined manner, or otherwise as known in the many fields of computing sciences and engineering,
- with the effect that the flow labels, method steps, flows of control, or operations might be performed or traversed in one or more orderings, whether directly specified in the figures or text, or as indicated therein as alternatives, or as substantially having the same properties or functions, or otherwise having substantially the same effect.

For example and without limitation, in the context of the invention, there is no particular requirement for the flow labels, method steps, flow of control, or operations, to occur in the order they are coupled or otherwise shown in the figures, or in the order they are described in the text.
- Where distinct or separate data elements are shown as being used or operated upon, those distinct or separate data elements might be substantially so used or substantially so operated upon in parallel, in a pipelined manner, or otherwise.
- Where an individual data element is shown as being used or operated upon, it might occur that the individual data element is substantially replicated, at least in part, with the effect that the individual data element might be used by more than one method step, flow of control, or operation, concurrently or in parallel or otherwise, consistently (or inconsistently with a form of reconciliation) or otherwise.
- Where described or shown in a figure, or in the text, machines, articles of manufacture, or compositions of matter (or of matter and energy), might be disposed for including or maintaining, whether relatively permanently or relatively evanescently, or otherwise, information.
  - Where such information is specified, either relatively generally or relatively in detail, such information might be included or maintained by any technique involving the use of matter, combinations or conjunctions of matter and energy, techniques derived from computing sciences or information sciences, or other techniques in which such information might be derived or interpretable by one or more computing devices, at a later time or distinct place, or at another event in space-time.

Although this description focuses on techniques for encoding information presently known to those skilled in the art, or where no such techniques are described, on techniques known in the many fields of computing science or information science, in the context of the invention, there is no particular requirement therefore. For example and without limitation, any and all such techniques for including or maintaining information, retrievable at a later time or distinct place, or at another event in space-time, might be applicable, even if currently not obvious to those of ordinary skill in the art.

Where such information is specified, that information might be included or maintained by any one or more coding schemas, or other techniques for maintaining information against error, loss, inaccessibility, or other issues, which should be generally inferred by the reader when construing or interpreting techniques described herein. For example and without limitation, techniques such as use of data backup or recovery, data mirroring, parity information, redundant encoding, triple-modular or other redundancy, and other methods known in the many fields of computing science or information science, should generally be implied by this description whenever inclusion, maintenance, transmission, copying, or other treatments of information are involved.

Where such information is specified, that information might be contemplated to be included or maintained with the effect of retaining that information for use in another context, at another place or time, in another device or in a similar or identical device otherwise distinct, or embodied in a form suitable for carriage or copying from a $1^{st}$ place or time to a $2^{nd}$ place or time, such as on a device being at least in part electromagnetic, optical, physically configured, or making use of quantum-mechanical principles with respect to information.

Where such information is specified, that information might be segregated into individual portions, each representing whole number of bits, partial bits, probabilistic or conditionally probabilistic conditions from which information might be deduced, or otherwise. Although this description focuses on information-bearing articles which can be written, read, or transported in individual units, in the context of the invention, there is no particular requirement therefor.

For example and without limitation, information might be recorded, stored, or otherwise maintained on one or more physical elements or devices, with the information being separated either logically, physically, or holographically (the latter including the possibility that more than one such physical element or device might be involved in recovery or interpretation of the information).

For a $1^{st}$ example and without limitation, in one embodiment, a RAID disk-drive system might include information with the property that any one individual device or even any one individual storage block is generally insufficient to allow a computing device to determine any one or more individual datum without reference to another device or storage block.

For a $2^{nd}$ example and without limitation, in one embodiment, an information-bearing element might include information that is encoded or encrypted with the property that any one individual device or even any one individual storage block is generally insufficient to allow a computing device to determine any one or more individual datum without reference to a decoding or decrypting key.

For a 3rd example and without limitation, in one embodiment, an information-bearing element might include information that is accessible to a software component using a communication system, such as for example with the assistance of a coding system associated with a communication system, a communication protocol, an error-correcting code associated with an information-bearing element, a method or technique of associating or including data or information within a signal (such as for example a communication signal), or any one or more techniques known in the fields of computing science that might have the effect of allowing the recovery of information, either concurrently or at a later time.

Where such information is specified, that information might be interpretable by a computing device, or other data-processing device, as representing instructions to a device (including the possibility of a Turing-equivalent computing device operating under control of those instructions, either with or without additional instructions with the effect of providing additional functionality), as representing data to be compared, manipulated, reviewed, or otherwise processed by a device, as representing data describing a format of such data, such as for example a schema for a relational database, as representing metadata of some type, such as for example a measure of freshness or reliability of information, or otherwise, or combinations or conjunctions thereof.

For example and without limitation, in one embodiment, an information-bearing element might include information interpretable as hardware instructions, assembly-language instructions, compilable or interpretable higher-level language instructions, scripting instructions, or otherwise, or some combination or conjunction thereof.

For example and without limitation, in one embodiment, an information-bearing element might include information interpretable as a data encoding format, as a relational database schema or other database descriptor, as a data structure such as a tree structure, directed acyclic graph, heap storage, stack frame, or otherwise, or some combination or conjunction thereof.

For example and without limitation, in one embodiment, an information-bearing element might include data values to be compared, manipulated, reviewed, or otherwise processed by a device, such as for example a set of integers, floating-point numbers (for example, in an IEEE floating-point number standard format), data structures representing or indicative of other model-able elements, or otherwise, or some combination or conjunction thereof.

For example and without limitation, in one embodiment, an information-bearing element might include metadata of some type, such as for example a measure of freshness or reliability of information, a measure of precision or significance of figures, a measure of possible error, or otherwise, or combinations or conjunctions thereof.

Although this description is focused upon particular types of information as detailed herein, in the context of the invention, there is no particular requirement for any such limitation. For example and without limitation, there is no particular requirement that information or data need be represented in a digital format (an analog format might be a substitute), in a binary format (a format in a digital radix or other radix might be a substitute), in a time-division or space-division format (a format using a frequency-division or code-division format might be a substitute), or otherwise, or some combination or conjunction thereof.

FIG. 1

Figure 1:
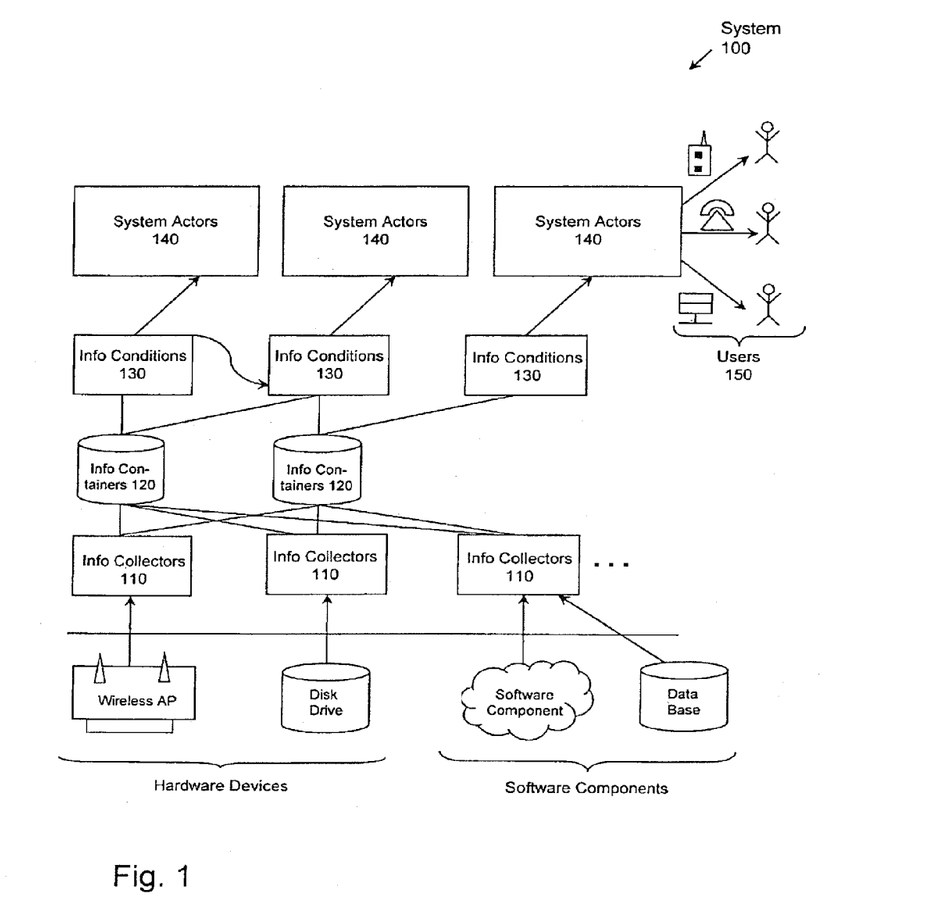
FIG. 1 shows a conceptual drawing of a system.

FIG. 1 shows a conceptual drawing of a system 100, including elements shown in the figure, including at least a set of information collectors 110, a set of information containers 120, a set of information conditions 130, a set of system actors 140, and a set of users 150.

A set of information collectors 110 might include one or more elements responsive to a state, status aspect, or state of the system 100, such as for example a state, status aspect, or state-change of the system, as those phrases and terms are described above.

For a 1st example and without limitation, a state of the system 100 might include information with respect to whether or not a disk-drive in a storage element has responded to a request with an error report, or whether or not a disk-drive in a storage element has responded to a request with a report indicating a completion of a proper read or write operation, or otherwise, or some combination or conjunction thereof.

For a 2nd example and without limitation, a state of the system 100 might include information with respect to software components or elements (or sub-components or subelements), particularly but not limited to those software components integrated into portions of the operating system or firmware by another vendor, obtained from external vendors, or otherwise, or some combination or conjunction thereof.

In such 2nd examples, it might occur that software errors, also known as bugs, might appear or occur in response to third-party components, the interaction of more than one such third-party components, the interaction of such third-party components with trusted code, or otherwise, or some combination or conjunction thereof. For example and without limitation, external software components might include information collectors that generally provide useful data, but which infrequently or otherwise from time to time erroneously provide undocumented or unexpected output values (such as for example, floating-point values where integer values are expected), or which erroneously provide output values that are clearly invalid (such as for example, negative values for available disk free space or disk size), or which generate crash results, invalid interrupts, memory leaks or other memory errors.

Moreover, it might occur that a state of the system 100 might include information with respect to combinations or conjunctions of hardware and software elements, or the interaction of hardware and software elements.

In a 1st such embodiment, one or more such information collectors 110 might include a physical sensor, such as for example a parity computation element coupled to an output of one or more disk-drives, with the effect of providing information with respect to whether or not those one or more disk-drives maintain information that is consistent with respect to parity (and which thus might be concluded to be accurate, as contrasted with information that is not consistent with respect to parity). Such a parity computation element might include a hardware device disposed for computing parity or parity values, or might include a programmable computing device operating under instructions capable of determining parity or parity values, or otherwise as known in the many fields of computing science.

In a 2nd such embodiment, one or more such information collectors 110 might include a latch, register, memory element or other storage device, with the effect that data or information relating to software components or elements (or sub-components or subelements) of the system 100 might be used or maintained in association with operation of the system 100, or some portion thereof. For example and without limitation, one or more such information collectors 110 might be coupled to external software components as noted above, or to hardware components associated with such external software components as noted above, with the effect that such data or information might be collected for use or maintenance in association with other elements of the system 100 as described below.

In one embodiment, one or more such information collectors 110 might be regarded as devices or other system elements whose associated tasks include determining substantial events (or substantial lack of events) deemed material to proper operation of the system. For a $1^{st}$ example and without limitation, while parity errors in storage devices might be expected from time to time, such parity errors might be deemed sufficiently significant that the system 100 might deem it proper to take action in response thereto. For a $2^{nd}$ example and without limitation, while improper status values might be expected from time to time, such improper status values might also be deemed sufficiently significant that the system 100 might deem it proper to take action in response thereto.

A set of information containers 120 might include one or more elements responsive to one or more said information collectors 110, whether individually or collectively, and each of which maintains both status values and metadata about those status values, said metadata being indicative of whether those status values might be reliably used by those system elements.

For a $1^{st}$ example and without limitation, an information container 120 might include information with respect to whether or not a disk-drive in a storage element has responded to a request with an error report, or alternatively, with a report indicating a completion of a proper read or write operation, as described above, together with metadata indicating how recently that storage element has made that report.

For a $2^{nd}$ example and without limitation, an information container 120 might include information with respect to whether a status value is consistent with a known correct value (such as for example whether a clock value or timer value is consistent with an external reference), or whether a status value is consistent with a value that might be deemed accurate (such as for example whether a value indicating a number of free disk blocks is non-negative).

In either such case, the information container 120 might include information with respect to both the reliability of the data and with respect to the a measure of accuracy of the data. In the $1^{st}$ example described above, in one embodiment, said metadata indicating how recently that storage element has made that report might be used by other elements of the system 100 as part of determining whether that disk-drive has responded sufficiently recently without error as to be deemed reliable.

In one embodiment, said metadata might indicate a measure of recency of said status values, or might indicate a measure of accuracy or significance of said status values, or might indicate some other information about said status values to which an element of the system 100 might respond as part of determining whether or not said status values are sufficiently substantially fresh or substantially reliable as to be used in further calculations or other determinations with respect to system operation.

In one embodiment, one or more such information containers 120 might be regarded as devices or other system elements whose associated tasks are to maintain information about status values, as well as information about whether those status values are sufficiently reliable for use. For example and without limitation, while parity errors in storage devices might be expected from time to time, it might occur that such parity errors are substantially evanescent, and that a re-attempt to perform the same read or write operation is later successful without incident. In such cases, the system 100 might deem it proper to disregard such parity errors that were not persistent after more than a one (or a few) attempts to perform the associated read or write operation.

A set of information conditions 130 might include one or more elements responsive to one or more said information containers 120, or responsive to one or more other said information conditions 130, whether individually or collectively. For a $1^{st}$ example and without limitation, one or more said information conditions 130 might be responsive only to information containers 120, such as for example an information condition 130 that maintains information regarding whether there has been a recent parity error in any storage element of the system 100. For a $2^{nd}$ example and without limitation, one or more said information conditions 130 might be responsive to such information containers 120 as well as to other information conditions 130, such as for example whether there has been a recent parity error in any particular storage element of the system 100 in combination or conjunction with a recent replacement of a disk-drive in that same particular storage element.

For a $3^{rd}$ example and without limitation, one or more such information conditions 130 might be responsive to such information containers 120 as well as to other information conditions 130, as well as to other factors. Such other factors might include any other factors described herein. For example and without limitation:

Such other factors might include a system parameter, such as a threshold for whether a $1^{st}$ information condition 130 is deemed sufficiently important to raise a $2^{nd}$ information condition 130. An example of such a system parameter might be whether a number of recent parity errors in a particular storage element of the system 100 exceeds some minimum number, e.g., more than 3 parity errors in a second. Information conditions 130 might have access to a set of system parameters, which might help those information conditions 130 determine the significance of any particular event.

Such other factors might include a memory value or state maintained by an information condition 130. An example of a memory value or state might be whether a particular software module has signaled a particular type of error, or has signaled any error, within a recent time. A "recent time" might be determined by a system parameter, such as 1 second. Information conditions 130 might maintain substantial memory or state information, and might be capable of making any general-purpose computation, or any special-purpose computation.

In one embodiment, one or more such information conditions 130 might be regarded as devices or other system elements whose associated tasks are to maintain relatively higher-level information about a state or status of the system 100. For example and without limitation, while it might occur from time to time that a disk-drive or other storage device presents a page fault or page trap, it might involve a more complicated determination to conclude whether or not a particular disk-drive is presenting a condition known in the art of storage systems as "thrashing". While it might occur that individual page faults or page traps are not of relatively great significance, a relatively substantial number of them occurring in a relatively short duration might be an indicator that the an element of a storage system is thrashing. Accordingly, one or more such information conditions 130 might be disposed for determining if such an event is in process.

In one embodiment, the system 100 is disposed with the effect that substantially all such information conditions 130 are consistent with a substantially single, consistent holistic picture of the system 100 as an operational whole. This has the effect that such information conditions 130 are substantially pairwise consistent, with the effect that elements of the system 100 that depend on those information conditions 130 operate substantially without inconsistency.

A set of system actors 140 might include one or more elements responsive to said information conditions 130, with the effect that said system actors 140 operate responsive to a substantially single, consistent holistic picture of the system 100 as an operational whole, and with the effect that said system actors 140 operate substantially without inconsistency. In one embodiment, system actors 140 each might have an associated action, each system actor 140 having a particular action to be performed in response to that particular system actor 140 being triggered, those associated actions being logically consistent with a substantially single global status of the system 100.

In one embodiment, said system actors 140 might each be disposed into one or more classes: (1) notifiers, which serve to present notifications to system monitors, system operators, or users; and (2) ameliorators, which serve to act upon a status of the system 100 to correct errors, improve system performance (e.g., to eliminate thrashing or to otherwise improve system performance, distribute or redistribute loan, or otherwise detect and correct system operation gone awry).

In one embodiment, those system actors 140 disposed as notifiers might be disposed as substantially read-only with respect to a status of the system, while those system actors 140 disposed as ameliorators might be disposed as substantially able to alter a status of the system 100. While this description is at least partially directed to system actors 140 which are so divided in operation, in the context of the invention, there is no particular requirement for any such limitation. For a $1^{st}$ example and without limitation, it might occur that a system actor 140 disposed as a notifier also has the capability of modifying a state of the system 100 so that no more than a designated number of notifications are generated. For a $2^{nd}$ example and without limitation, it might occur that a system actor 140 disposed as an ameliorator also has the capability of adjusting a state of the system 100, diagnosing or correcting an operational problem with the system 100, and restoring the system 100 to a state of the system 100 it had before operation of the ameliorator.

A set of users 150 might include one or more system monitors, system operators, human operators or users, system controlling devices or software, or Artificial Intelligences disposed for controlling the system 100 or for reporting on operation of the system 100 to other devices or elements. While this description is at least partially directed to embodiments in which users 150 include one or more human beings capable of understanding the system 100, in the context of the invention, there is no particular requirement for any such limitation. For example and without limitation, the system 100 might operate under the control or direction of another automated device, such as for example an Artificial Intelligence, which serves to maintain the proper operation of the system and to substantially optimize its performance.

FIG. 2

Figure 2:
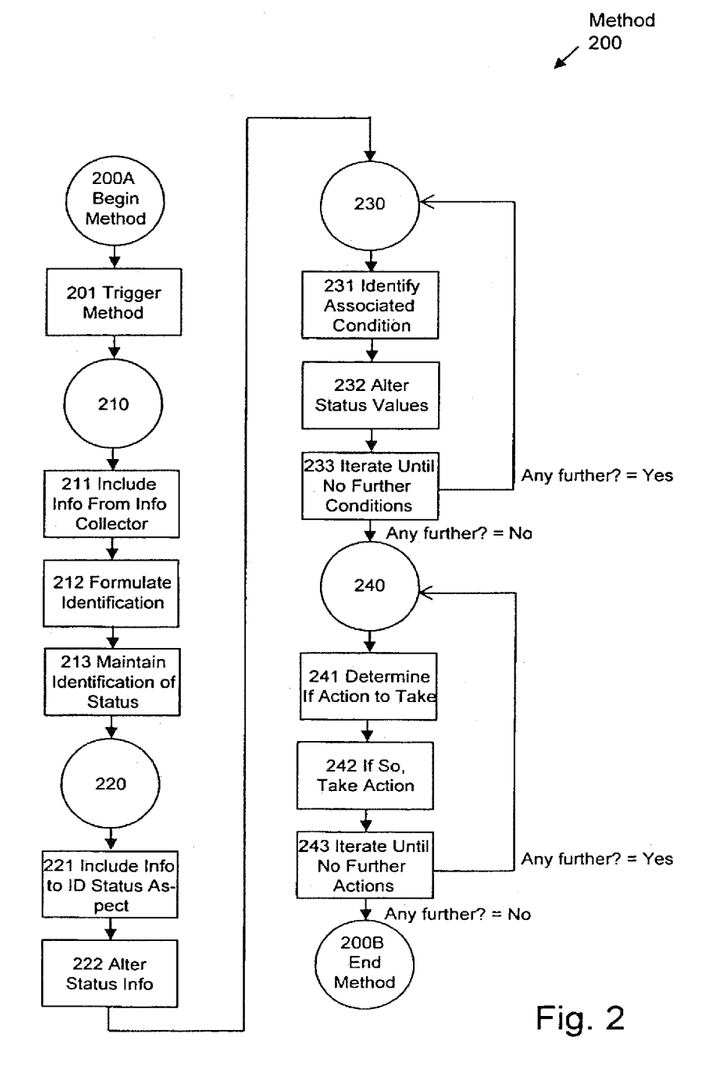
FIG. 2 shows a conceptual drawing of a method.

FIG. 2 shows a conceptual drawing of a method 200, including flow labels and method steps as shown in the figure.

As described herein, the method steps are shown in the figure and described in a linear order. However, in the context of the invention, there is no particular requirement that the flow labels or method steps be encountered or performed linearly, in any particular order, or by any particular device. For example and without limitation, the flow labels and method steps might be encountered or performed in parallel, in a pipelined manner, by a single device or by multiple devices, by a general-purpose processor or by a special-purpose processor (or other special-purpose circuitry disposed for carrying out part or all of the method 200), by one or more processes or threads, at one or more locations, and in general, using any one or more of the techniques known in the many arts of computing science.

Beginning of Method

Reaching a flow label 200A indicates a beginning of the method 200.

At a step 201, the method 200 is triggered and begins operation. In various embodiments, the method 200 might be triggered by one or more of the following:

a state-change or change in a state value of the system 100 or any portion thereof, or a failure to make an expected or predicted or otherwise proper state-change or change in a state value of the system 100 or any portion thereof;

a detection of an error condition, or a partial error condition, or a warning condition, or a condition or a state-change or a state value of the system 100, or any portion thereof, which is unusual, or for which an operator or other user 150 has designated should be watched-for, or a failure to detect a proper condition (that is, a non-error condition) under similar circumstances;

a passage of time, a trigger such as a clock-timer or watchdog-timer interrupt, or similar such event;

a particular type of event, such as for example a command or other intervention by an operator or other user 150, or a failure of occurrence of an expected command or other intervention by an operator or other user 150 (such as for example, a check-in by an operator or other user 150 at a time of shift change, or at an expected time, or in response to a challenge-and-response to one or more operators or users 150; or by other techniques or triggers, such as for example those known in the many fields of computing science.

While this description is at least partially directed to embodiments with respect to specific techniques for triggering the method 200, such as in this step, in the context of the invention, there is no particular requirement for any such limitation. The method 200 might be triggered, such as in this step, by any technique suitable for triggering a computation, method, or process.

The method 200 proceeds with the flow label 210.

Information Collectors

Reaching a flow label 210 indicates that an information collector 110 has identified a status aspect of the system for which that information collector 110 has determined should be maintained or reported. For a $1^{st}$ example and without limitation, an information collector 110 might maintain a record of a measure to which a disk-drive has its storage blocks in use by active data or by redundant data (such as for example, parity data). For a $2^{nd}$ example and without limitation, an information collector 110 might maintain information indicative of whether data it receives from a source (such as for example an external software element) is valid data, or is within a selected threshold of deemed accuracy. A longitudinal-time record of such a measure might be used in determining whether or not a particular state-change or state value of the system 100, or portion thereof, should be determined, indicated, maintained, reported, or acted upon.

Examples of types of information for which an information collector 110 could identify might include one or more of the following:

- a number of storage blocks in use;
- a number of disk-drive requests within a particular duration, such as for example the past 30 seconds or the past 30 minutes;
- a fraction of those disk-drive requests that were properly satisfied, or for those such disk-drive requests that were not properly satisfied, a break-down by type of the errors that might have occurred or were reported with respect to those requests;
- any other type of information which an information collector 120 might wish to record, or might wish to deem sufficiently of interest to report to an operator or other user 150.

At a step 211, the method 200 includes operation by an information collector 110 to identify such a status aspect of the system 100.

At a step 212, the method 200 includes operation by an information collector 110 to formulate that identification of such a status aspect of the system 100 in an information format, such as for later use.

At a step 213, the method 200 includes operation by an information collector 110 to maintain that identification of such a status aspect of the system 100, such as in a dataset, a data variable, a database, or a file.

Information Containers

Reaching a flow label 220 indicates that an information container 120 has identified a status aspect of the system that one or more information collectors 110 have determined should be maintained or reported, and which have changed (in nature or value) since a most recent time that status aspect has been identified. For example and without limitation, an information collector 110 might maintain a record of a measure to which a disk-drive has its storage blocks in use by active data or by redundant data (such as for example, parity data). Moreover, it might occur that the status information maintained by the information collector 110 has been refreshed relatively recently, or has become stale (that is, has not been refreshed sufficiently recently).

At a step 221, the method 200 includes operation by the information container 120 to identify such a status aspect of the system 100.

At a step 222, the method 200 includes operation by the information container 120 to alter the status information it maintains, whether the nature or value or both thereof. For a $1^{st}$ example and without limitation, it might occur that the information collector 110 has identified a new status value. For a $2^{nd}$ example and without limitation, it might occur that the relative freshness of the status information has changed, either from un-fresh to fresh (that is, the status information has been relatively recently refreshed) or from fresh to un-fresh (that is, the status information has not been refreshed and has become stale).

In the $1^{st}$ example described above, the information container 120 might alter or otherwise modify the status value associated with that particular status information.

In the $2^{nd}$ example described above, the information container 120 might alter or otherwise modify metadata associated with that status value as fresh (if the status information has become fresh) or as stale (if the status information has become stale).

In other examples, the information container 120 might alter or otherwise modify the particular status value, or metadata associated therewith, with the effect that the information container 120 maintains both data and metadata for the particular status value that is consistent with a single global status for the system, such as, with a holistic status of the system.

Information Conditions

Reaching a flow label 230 indicates that an information condition 130 has identified a condition it deems significant, such as for example whether a particular disk-drive is exhibiting too many errors (with the likely conclusion that the particular disk-drive is nearing its end of life). In one embodiment, a system designer, implementer, coder, operator, or other user 150 might determine the logical precepts by which the information condition 130 identifies its designated condition. For a set of examples and without limitation, information conditions 130 might include such determinations as the following:

- one or more particular system values, together with metadata indicating those system values' reliability, exceeds a specified threshold, or falls outside a specified viable region—for example and without limitation, if the number of failed disk-drive operations exceeds a specified value, or if the timing response of a particular disk-drive falls outside a specified viable region (such as for example, no less than 5 milliseconds nor more than 15 milliseconds to respond to a disk-drive command), the information condition 130 might conclude that its associated condition is raised (in the sense that an interrupt might be "raised"); some number of particular system values satisfy a specified information condition 130, such as for example that a number of failed disk-drive commands for both a $1^{st}$ disk-drive and a $2^{nd}$ disk-drive both exceed (in the case of an 'AND' logical operation) or either exceed (in the case of an 'OR' logical operation) specified values—for example and without limitation, if a $1^{st}$ disk-drive exceeds 5 read-command errors within a $1^{st}$ duration of 100 milliseconds, and also a $2^{nd}$ disk-drive exceeds 3 read-command errors within a $2^{nd}$ duration of 100 milliseconds overlapping with that $1^{st}$ duration, the information condition 130 might conclude that its associated condition is raised—in alternative embodiments, the information condition 130 might conclude that its associated condition is raised if 3 out of 5 such disk-drives have a specified number of problems, or otherwise, or some combination or conjunction thereof;
- a fuzzy-logic, neural-network, or other non-Boolean logic technique might lead the information condition 130 to conclude that its associated condition is raised—for example and without limitation, if the information condition 130 determines that the number of errors associated with a particular disk-drive has become "too many", for some definable Artificial Intelligence or machine learning technique, yet not necessarily for any particular specific value, the information condition 130 might conclude that its associated condition has been raised;
- input from a user 150, such as for example associated with a warning light or a metering display, might lead an information condition 130 to conclude that its associated condition has been raised;
- after reading this application, those skilled in the art would recognize that many other techniques for determining whether an information condition 130 should be raised would be workable, would not require undue experimentation or further invention, and are within the scope and spirit of the invention.

At a step 231, the method 200 includes operation by the information condition 130 to identify its associated condition.

At a step 232, the method 200 includes operation by the information condition 130 to alter any status values dependent on the associated condition. For example and without limitation, if the associated condition is that a particular disk-drive is deemed to be non-operational, the information condition 130 sets a status value for that particular disk-drive to indicate that it is non-operational (and the recency of the system values that were used to make that determination).

At a step 233, the method 200 iterates upon the steps associated with the flow label 230, that is, the step 231 and the step 232, until no further information conditions 130 raise their associated conditions. This has the effect that the set of information conditions 130 forms a machine-inference engine. Conclusions from changes in system values or their metadata cascade substantially until substantially no further changes might be derived from that effective machine-inference engine from changes in system values or their metadata. In one embodiment, it might occur that normal operation of the system 100 has the effect that any inconsistencies found in data input to the system are eventually identified as conclusions from such data, with the effect that any such inconsistencies are eventually found by the system, with the effect that the system can take action to ameliorate or correct any such inconsistencies.

System Actors, Including Notifiers

Reaching a flow label 240 indicates that a system actor 140 has identified a condition (set by an information condition 130) for which it deems it should take action, such as for example whether a particular RAID stripe has had a parity error and should be re-striped. In one embodiment, a system designer, implementer, coder, operator, or other user 150 might determine the logical precepts by which the system actor 140 identified when and what action it should take.

As noted above, actions the system actor 140 might take include:

$1^{st}$, notification actions, in which the system actor 140 sends a message to a user 150, or other entity, and without making any substantive change to the system 100, except perhaps to make a log entry regarding the notification.

$2^{nd}$, modification actions, in which the system actor 140 makes a change to the state of the system 100, such as for example correcting an error that has been detected, or taking engaging in preventive maintenance to stave off a potential future error.

After reading this application, those skilled in the art would recognize that actions the system actor 140 might take might include some combination or conjunction thereof, or other activity.

For a set of examples and without limitation, the system actors 140 might take such actions as the following:

Upon detecting a failed disk drive (or a disk drive likely about to fail), a parity error, or any other indicator of erroneous data, whether presently detected or likely to occur, the system actor 140 might take action to re-stripe the affected RAID stripe, with the effect of better protecting the data against loss. For a $1^{st}$ example and without limitation, a single ($1^{st}$) parity error in a RAID stripe can be recovered by re-computing the data bit or parity bit that was lost from the remaining bits, while a $2^{nd}$ parity error in a RAID stripe might make the data unrecoverable.

Upon detecting a lost data block, such as for example a storage block including data that is improperly integrated into the file system, the system actor 140 might take action to copy that data block to another storage block and to properly integrate that newly-selected storage block into the file system.

Upon detecting an aborted file system operation (whether aborted in response to a system error or in response to user action, or some combination or conjunction thereof), the system actor 140 might determine those system changes that were made in the process of the aborted file system operation, but not yet committed to the file system state, and undo those system changes. For example and without limitation, if a file-copy operation was not completed, for any reason, there might be storage blocks with extra data remaining which need not maintain that data; that data might be erased and those storage blocks might be freed for other uses.

Upon detecting one or more particular system values, together with metadata indicating those system values' lack of reliability, the system actor 140 might take action to refresh those particular system values, with the effect of maintaining a set of relatively more reliable system values and thus a relatively more reliable global system state.

At a step 241, the method 200 includes operation by the system actor 140 any associated condition, or combination or conjunction thereof, that might indicate action that should be taken.

At a step 242, the method 200 includes operation by the system actor 140 to take action indicated in response to the just-earlier step (241). For example and without limitation, if the associated action is that a particular RAID stripe should be re-striped, the system actor 140 invokes the file system to re-stripe that particular RAID stripe. If it is appropriate for the system actor 140 to alter a status value for that particular disk-drive to indicate that it is now operational (and, possibly, the recency of the system values that were used to make that determination).

At a step 243, the method 200 iterates upon the steps associated with the flow label 230, that is, the step 241 and the step 242, until no further system actors 140 indicate that action should be taken in response to information conditions 130. Similar to information conditions 130, the has the effect of forming a machine-inference engine, in that conclusions from changes in system values or their metadata cascade substantially until substantially no further changes might be derived from that effective machine-inference engine from changes in system values or their metadata.

In one embodiment, one or more said system actors 140 might include, in whole or in part, one or more finite state machines as embodiments, in whole or in part, of one or more of said determinations of whether action should be taken in response to information conditions 130.

While this application is at least in part directed to the use of finite state machines as embodiments, in whole or in part, for said system actors 140, in the context of the invention, there is no reason for any such limitation. For a $1^{st}$ example and without limitation, one or more said system actors 140 might include, in whole or in part, one or more artificial neural-network circuits, one or more expert system circuits, one or more fuzzy logic circuits, one or more genetic programming circuits, one or more other circuits used at least in part for determining whether action should be taken in response to said information conditions 130, or some combination or conjunction thereof.

In embodiments in which said system actors 140 include, in whole or in part, one or more finite state machines, said embodiments might include said finite state machines configured to transition between and among states of said finite state machines in response to said status values or in response to said metadata associated with said status values. For one example and without limitation, where said metadata indicates that said information conditions are not sufficiently reliable as to be deemed valid, said one or more finite state machines might transition to states in which said said information conditions are so treated, with the possible effect that said one or more finite state machines might determine that such information conditions are invalid.

End of Method

Reaching a flow label 200B indicates an end of the method 200. In one embodiment, the method 200. In one embodiment, the method 200 might be readied for re-performance in response to a trigger as described with respect to the flow label 200A.

ALTERNATIVE EMBODIMENTS

The invention has applicability and generality to other aspects of information system management and system reporting, including at least
- automated command, control, and management of complex systems;
- automated reporting of system status to operators, users, and other interested entities;
- automated self-repair of frangible complex systems;
- machine learning of operation of complex systems, particularly those that might be distributed or which might have distributed status dependencies.

The invention claimed is:

1. A system including
one or more collectors, said collectors each disposed to operate independently to maintain a status value relating to said system, wherein at least one said status value is disposed to change during operation of said system;
one or more containers, said containers each disposed to operate independently in response to a collector, and each maintaining both said status value and metadata indicating whether said status value can be reliably used;
a physical medium including global status information accessible by a computing device, said global status information indicating a single global status of said system;
one or more conditions, said conditions disposed to operate on said computing device sequentially and consistently with said single global status, each responsive to one or more containers or conditions, and each associated with an output; and
one or more actors, said actors disposed to operate on said computing device sequentially and consistently with said single global status, each responsive to one or more conditions, at least one of said actors disposed to operate to alter said single global status;
a RAID storage system, said storage system including one or more disk drives;
wherein at least one particular said actor is disposed to restripe or recompute parity, in response to a presence of a newly available and reliable disk drive;
wherein
said collectors and containers can operate independently to provide data relating to said single global status at speeds independently associated with each said collector or container; and
said conditions and actors can rely on a consistency of said single global status to operate on said computing device at a speed independent of any collector or container, during operation of said system.

2. A system as in claim 1, including
a RAID storage system, said storage system including one or more disk drives;
wherein at least one particular said condition has an output responsive to a disk drive being unavailable or unreliable.

3. A system as in claim 1, including
a storage system, said storage system including one or more disk drives;
wherein at least one particular said actor is disposed to distribute or redistribute load for said storage system.

4. A system as in claim 1, wherein
at least one particular said actor is disposed to alter data retrieved from said collectors and containers, when said data is deemed inaccurate, with alternative data deemed accurate.

5. A system as in claim 1, wherein
at least one particular said condition includes a system parameter, an output of said particular condition being responsive to a comparison of said system parameter with a result of a calculation relating to at least one of: said status value, said metadata.

6. A system as in claim 1, wherein
at least one particular said container includes a time value, said metadata being responsive to a comparison of said time value with a current time.

7. A system as in claim 1, wherein
at least one particular said container includes validity information, said metadata being responsive to a comparison of said validity information with said status value associated with said particular container.

8. A system as in claim 1, wherein
one or more said actors are disposed to notify an element external to said system.

9. A system as in claim 1, wherein
one or more said collectors includes a physical sensor.

10. A system as in claim 1, wherein
said collectors can be pairwise inconsistent;
said containers can be pairwise inconsistent; and
said conditions are pairwise consistent.

11. A system as in claim 1, wherein
said metadata includes whether said status value is fresh.

12. A system as in claim 1, wherein
said status values indicate an absence or presence of one or more of:
a disk failure, a file system error, a hardware error, a page fault or page trap, a parity error, a stimulus, an alarm, an interrupt.

13. A system as in claim 1, wherein
said system includes a cluster; and
at least one particular said actor is disposed to shut down said cluster in response to information indicating a power failure or a limit to UPS runtime.

14. A system as in claim 1, wherein
said system includes a cluster; and
at least one particular said actor is disposed to synchronize time values at more than one node in said cluster.

15. A system as in claim 1, wherein
two or more said collectors are disposed to operate in response to distinct stimuli.

16. Apparatus including
a cluster computing system;
a processor in said cluster computing system, said processor coupled to instructions interpretable by a computing device, said instructions directing said processor to implement
one or more collectors, said collectors each disposed to operate independently to maintain a status value relating to said system, wherein at least one said status value is disposed to change during operation of said system, one or more containers, said containers each disposed to operate independently in response to a collector, and each maintaining both said status value and metadata indicating whether said status value can be reliably used, a physical medium including global status information accessible by a said processor, said global status information indicating a single global status of said system, one or more conditions, said conditions disposed to operate on said processor sequentially and consistently with said single global status, each responsive to one or more containers or conditions, and each associated with an output, one or more actors, said actors disposed to operate on said processor sequentially and consistently with said single global status, each responsive to one or more conditions, at least one of said actors disposed to operate to alter said single global status; and a RAID storage system, said storage system including one or more disk drives, wherein at least one particular said actor is disposed to restripe or recompute parity, in response to a presence of a newly available and reliable disk drive;

wherein said collectors and containers can operate independently to provide data relating to said single global status at speeds independently associated with each said collector or container;

said conditions and actors can rely on a consistency of said single global status to operate on said computing device at a speed independent of any collector or container, during operation of said system;

said collectors and containers can operate independently in said cluster computing system to provide data relating to said single global status at speeds independently associated with each said collector or container; and said conditions and actors can rely on a consistency of said single global status at said processor to operate on said computing device at a speed independent of any collector or container, during operation of said system.

* * * * *